US005393368A

United States Patent [19]

Stevens

[11] Patent Number: 5,393,368

[45] Date of Patent: Feb. 28, 1995

[54] CORRECTION TAPE DISPENSER

[75] Inventor: Christopher J. Stevens, Reading, England

[73] Assignee: The Gillette Company, Boston, Mass.

[21] Appl. No.: 192,471

[22] Filed: Feb. 7, 1994

[30] Foreign Application Priority Data

Feb. 10, 1993 [GB] United Kingdom ................. 9302589
May 25, 1993 [GB] United Kingdom ................. 9310715

[51] Int. Cl.[6] .............................................. B32B 35/00

[52] U.S. Cl. .................................... 156/577; 156/540; 156/574; 156/579

[58] Field of Search ............... 156/577, 579, 574, 523, 156/540, 527

[56] References Cited

U.S. PATENT DOCUMENTS

| | | | |
|---|---|---|---|
| 2,815,142 | 12/1957 | Ames | 216/25 |
| 3,260,638 | 5/1962 | Hoveland | 156/575 |
| 3,314,625 | 4/1967 | Mahn | 242/55.12 |
| 3,398,909 | 8/1968 | Jotzoff | 242/55.11 |
| 3,552,686 | 1/1971 | Davidson | 242/201 |
| 3,944,161 | 7/1974 | Kauf | 156/579 X |
| 4,015,292 | 3/1977 | Kirn | 360/130 |
| 4,671,687 | 6/1987 | Tamai | 400/695 |
| 4,851,076 | 7/1989 | Manusch et al. | 156/577 |
| 4,853,074 | 8/1989 | Manusch et al. | 156/577 |
| 4,891,260 | 1/1990 | Kunkel et al. | 428/220 |
| 5,006,184 | 4/1991 | Manusch et al. | 156/577 |
| 5,135,798 | 8/1992 | Muschter et al. | 428/202 |

FOREIGN PATENT DOCUMENTS

0479221A2 4/1992 European Pat. Off. .

*Primary Examiner*—David A. Simmons
*Assistant Examiner*—Steven J. Helmer
*Attorney, Agent, or Firm*—Paul I. Douglas

[57] ABSTRACT

In a correction tape dispenser, wherein a backing ribbon carrying a layer of correcting composition is fed from a supply spool (2) around the edge (6) of an applicator tip (10) used to press the tape against a paper surface (P) to transfer the layer of correcting composition onto the paper, and back to a take-up spool (3), a tape guide system (11,12; 22,23) is provided near the tip to redirect the tape, the tip edge (6) being at an angle to the feed direction so that the body of the tape dispenser may be held in a forwardly and downwardly inclined orientation similar to that in which a writing instrument is normally held.

21 Claims, 6 Drawing Sheets

CORRECTION TAPE DISPENSER

BACKGROUND OF THE INVENTION

1. Field of the Invention

This invention relates to a correction tape dispenser for laying down a strip or band of correction composition onto a surface, most usually paper, e.g. to cover markings thereon to facilitate the correction of a mistake.

2. Description of the Prior Art

There are known correction tape dispensers which have supply and take-up spools for the tape mounted within a case to rotate about parallel axes with the supply spool being coupled to drive the take up spool through a slipping clutch arrangement. The case may be adapted to be held directly in the hand of the user, or it may form a cartridge which is inserted into a re-usable outer housing. A length of tape extending between the spools is guided to pass out of the casing and around a tip having a relatively sharp edge which is used to press the tape against the surface onto which the correction strip is to be applied. The tape consists of a ribbon, e.g. of plastics or paper, on one side of which is carried a coating of the correction composition, this coating being on the outer side of the ribbon when it passes around the tip. In use, the device is held in the hand and the tip is pressed down onto the paper surface so that its edge presses the tape against the surface across the full width of the tape. The correction composition has an adhesive quality and has greater adhesion to the paper than its carrier ribbon, so that when the tip is displaced across the paper surface in a direction perpendicular to the tip edge, the tip slides with respect to the ribbon causing tape to be drawn off the supply spool. The consequent rotation of the supply spool rotates the take-up spool so that a substantially constant tension is maintained in the tape and the take-up spool reels in the spent ribbon over which the tip has passed and from which the correction composition coating will have been deposited onto the paper surface. In this way a continuous strip of the correction composition is laid down onto the paper, this strip having a length according to the distance travelled by the dispenser tip.

The known correction tape dispensers operate satisfactorily as far as laying down the correction strip is concerned. However, they do require some practice to ensure that during displacement of the tip its edge is applied correctly against the paper. To a large extent the difficulty of ensuring the correct orientation of the tip is due to the device having to be held in an unnatural attitude, especially when the spools are arranged with their axes parallel to the tip edge.

SUMMARY OF THE INVENTION

The present invention addresses the drawback of the prior art devices and provides a correction tape dispenser comprising a tip having an edge for pressing the tape against a surface, a portion of tape between supply and take-up spools being guided to extend around said edge, wherein the edge is inclined to the feed direction in which the tape is guided to the tip, and the tip includes guide means on either side of the edge for redirecting the tape so that the path of the tape around the edge between the guide means is in a plane substantially perpendicular to said edge and inclined to the feed direction.

The tip employed in the dispenser of the invention allows the dispenser to be held in an orientation similar to that in which a writing instrument is normally held, namely inclined forwardly and downwardly away from the person using it, preferably at an angle to the paper in the range of 45° to 75°. As well as enabling a more natural holding position, the dispenser can allow the tip to be more readily viewed as the case enclosing the spools, and the hand of the user, can be disposed so as not to impede the user's sight of the tip. Thus, the convenience of use of the dispenser may be a substantial improvement on the prior art devices. The tape guidance can be simplified by the supply and take-up spools having their axes perpendicular to a plane containing the tip edge and substantially parallel to the feed direction.

The guide means may comprise a linear edge around which the tape extends to bend the tape path and simultaneously twist the tape. In one embodiment such linear edges are defined on respective sides of the tip by parallel ridges separated by a slot. Alternatively, the guide means on at least one side of the tip may comprise a guide element, e.g. a lateral projection, around which the tip passes to define a bend in the tape path. Conveniently, the guide element maintains the tape at the bend substantially perpendicular to the tip edge, and the tape is twisted longitudinally through substantially 90° between the guide element and the tip edge.

To retain the tape in proper cooperation with the tip edge, tape retaining means may be provided adjacent the edge on one or both sides of the tip. The retaining means can be arranged to prevent unintentional disengagement of the tape from the tip edge by defining with the tip a substantially closed eye through which the tape passes. The tip edge may have extensions to reduce risk of the tape becoming displaced over the edge extremities.

A full understanding of the invention will be gained from the following detailed description of an embodiment and reference to the accompanying drawings.

DETAILED DESCRIPTION OF THE PREFERRED EMBODIMENTS

Figure 1:
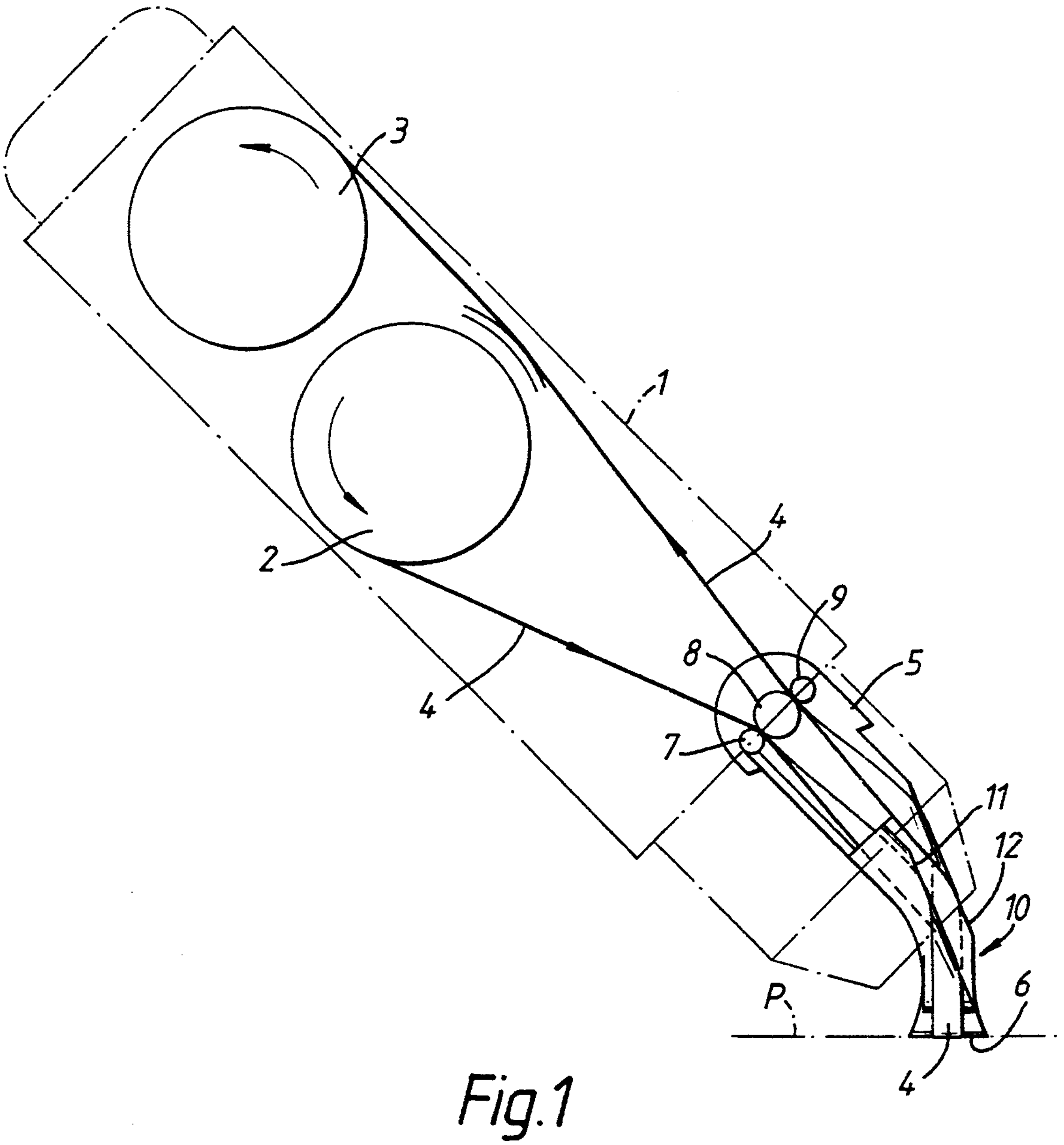
FIG. 1 is a schematic view of a correction tape dispenser in accordance with the invention.
Figure 2:
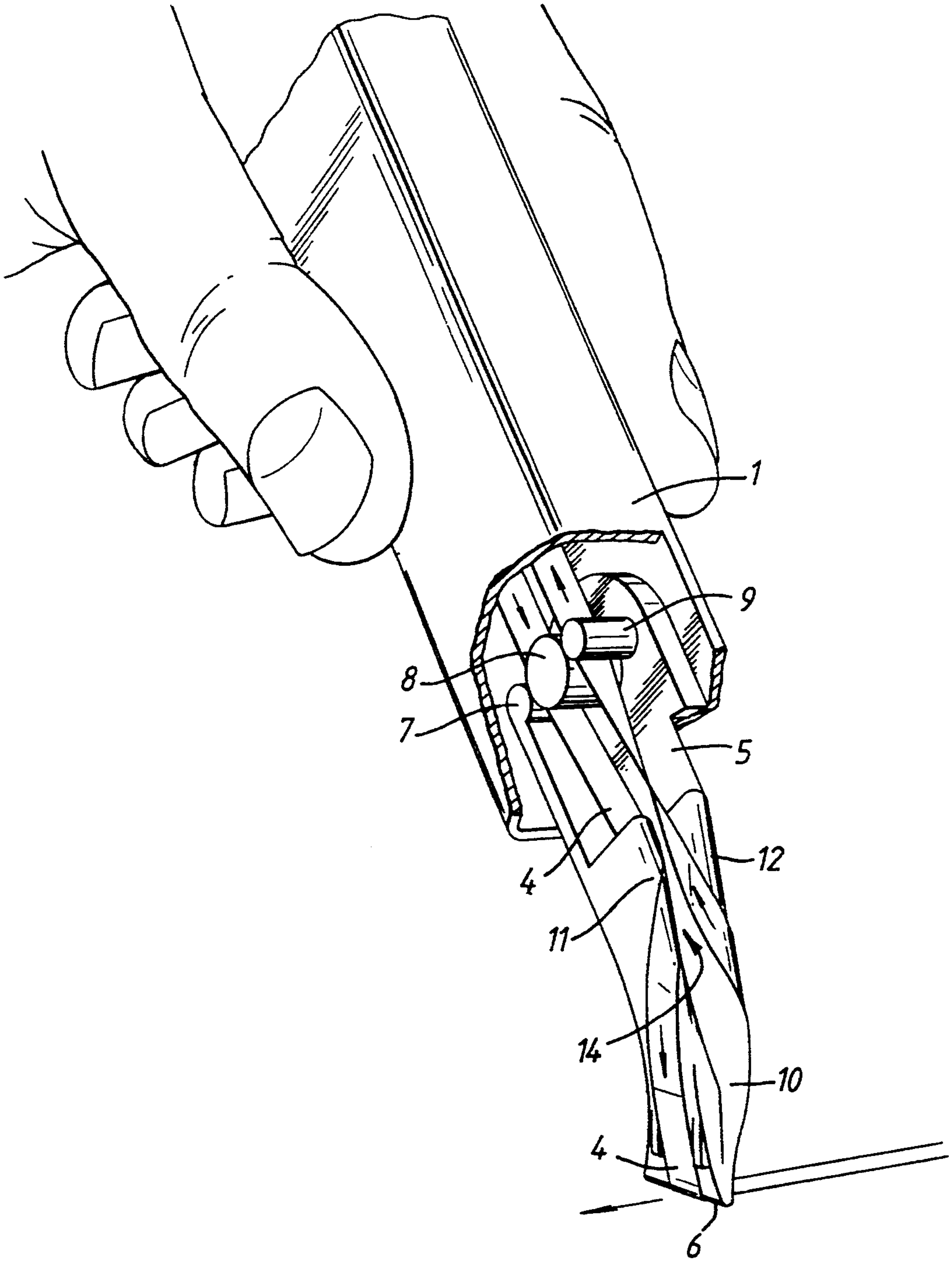
FIG. 2 is a perspective view of the dispenser in use, the casing being shown cut away to reveal the tip member.

The correction tape dispenser illustrated in FIGS. 1 to 5 of the drawings has case 1 in which are housed tape supply and take-up spools 2 and 3. The spools are rotatable about their respective parallel axes and as well known in the art the spools are coupled by a slipping drive mechanism (not shown) whereby rotation of the supply spool 2 in response to tape 4 being drawn therefrom causes the take-up spool 3 to rotate to reel in the tape to prevent the tape becoming slack between the spools. The tape itself can be conventional having a layer of correction composition coating one side of a carrier ribbon.

The case is of generally rectangular configuration and is elongated with the spools being displaced relative to each other longitudinally of the casing. Mounted in the casing and protruding from the forward end thereof is a tip member 5, the distal end of which defines an edge 6 by means of which the tape is pressed against the paper surface for transferring a strip of correction composition from the carrier ribbon onto the paper. A length of tape extending between the supply and take-up spools is guided to pass around the tip edge 6. The guiding means include tape positioning means provided by posts 7, 8, 9 conveniently disposed at the inner or proximal end of the tip member, and cooperating to define a first slot between posts 7 and 8 for prepositioning the tape coming from the supply spool ready for delivery in a predetermined feed direction to the tip 10, and a second slot between posts 8 and 9 for setting a fixed end position for the tape to pass away from the tip 10 in a predetermined direction parallel to the feed direction, before moving on towards the take-up spool 3. In the illustrated embodiment the feed direction is substantially parallel to the axis of the case 1, which may be desirable, but is not essential.

The tip member 5 is an integral plastics moulding and provides a tip 10 with a first portion and a second portion defining the edge 6 and at an angle to the first portion. The first portion comprises guide means in the form of two ridges 11, 12 defining parallel rectilinear edges inclined to the tape feed direction. A narrow slot 14 is formed between the ridges. The tape being delivered from the supply spool 2 and extending between the tape positioning posts 7 and 8 enters this slot 14 having twisted through 90° in passing from the posts to the tip 10 so that the coating of correction composition faces inwardly away from the ridge 11. From the slot 14 the tape passes over the edge of ridge 11, from the inside to the outside surface thereof, and is thereby redirected to extend towards the tip edge 6 in a direction perpendicular to that edge. Having passed around the tip edge, maintaining contact with the tip surface, the tape extends perpendicularly to the edge 6 until it reaches the edge of the ridge 12 around which it then passes before undergoing a 90° twist and passing between the posts 8 and 10. This path of the tape is clearly depicted in FIGS. 2 and 4. It will be understood that the correction composition coats the outer face of the tape ribbon as it approaches the tip edge 6 from the ridge 11. Furthermore this ribbon face is also directed away from the surfaces of the ridge 12 so that there will be no tendency for the tape to stick to the tip 10 even if there are traces of correction composition remaining on the ribbon after it has passed around the tip edge.

Figure 3:
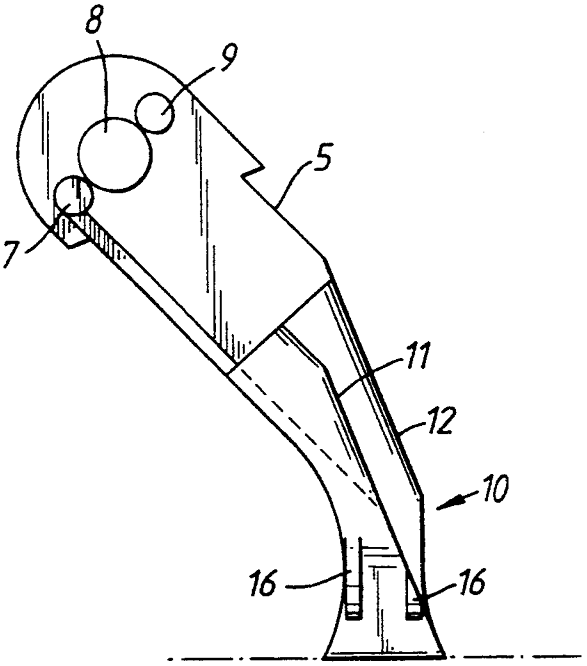
FIG. 3 is a side elevation of the tip member.
Figure 5:
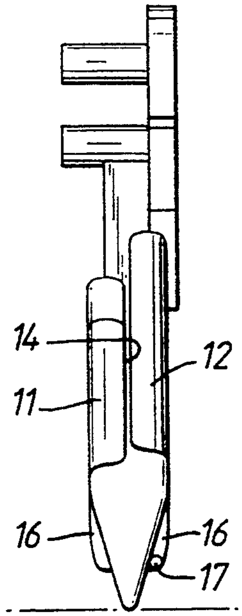
FIG. 5 is a front elevation of the tip member.
Figure 4:
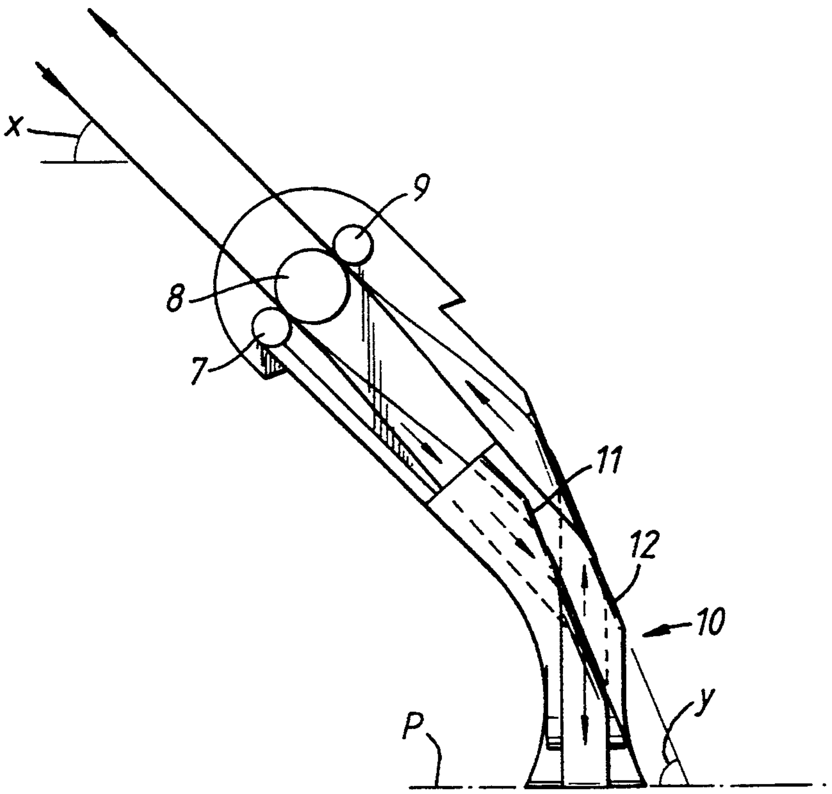
FIG. 4 is a side elevation of the tip member and also showing the path of the tape to and from the tip edge.

As may be best seen in FIGS. 3 and 5, on either side of the tip, adjacent the edge 6, are tape retaining means consisting of a pair of protruding guide wings 16 to assist in maintaining the tape along the correct path between the ridges 11, 12 and the edge 6. If required a pin 17 may be inserted to extend between the wings on one or both sides of the tip to provide a positive retention of the tape between the wings.

It will be appreciated that the geometry of the tip requires that the angle of inclination y (FIG. 4) of the ridge edges to the tip edge direction, i.e. a straight line on which the edge lies, is substantially equal to half the sum of 90° and the angle of inclination x of the tape feed direction to the tip edge direction. As the case 1 (FIG. 1) is elongated in the tape feed direction, the angle x is also the "writing angle" of the dispenser, i.e. the angle at which it is held in a downwardly and forwardly inclined orientation in use. A suitable "writing angle" would be in the range of 45° to 75°, preferably about 60°.

For laying down a strip of correction composition, the case of the dispenser may be held comfortably in the hand in essentially the same way as a conventional writing instrument would be gripped, that is mainly between the thumb and forefinger. The dispenser is held so that the tip edge 6 lies flat against the paper surface P, except that the tape 4 is interposed between the tip and the paper. The dispenser is then displaced across the paper in the lateral direction, normal to the tip edge 6, as indicated by the arrow in FIG. 2. Under the pressure exerted through the tip, the correction composition adheres to the papers surface and the tip slides along the tape ribbon causing fresh tape to be drawn from the supply spool 2 and laid down immediately in front of the moving tip while ribbon over which the tip has passed is drawn back into the case 1 and is reeled up onto the take-up spool 3, having left the correction composition previously carried thereby on the paper. Thus, a continuous band of correction composition with a length corresponding to the distance travelled by the tip is laid down without demanding any specific dexterity on the part of the person using the tape dispenser.

Alternative embodiments of the invention are shown in FIGS. 6 and 7 and FIGS. 8 and 9. Each of these dispensers is basically similar to the first embodiment and where the same reference numerals have been used in the drawings they denote corresponding parts. Each modified dispenser includes a case 1 housing tape supply and take-up spools 2 and 3, the spools being coupled by a slipping clutch mechanism and the tape 4 consisting of a layer of correction composition coating one side of a carrier ribbon. Protruding from a forward end of the elongated case is the tip member 5 defining the edge 6 used to press the tape against the paper surface for transferring a strip of correction composition from the carrier ribbon onto the paper, a length of tape 4 extending between the supply and take-up spools being guided to pass around the tip edge. The tip member includes guide means for redirecting the tape so that the edge 6 is inclined in the feed direction in which the tape travels towards the tip member, and the correction tape dispenser has a "writing angle" of 45° to 75°, preferably about 60°, to the paper.

Figures 6, 7:
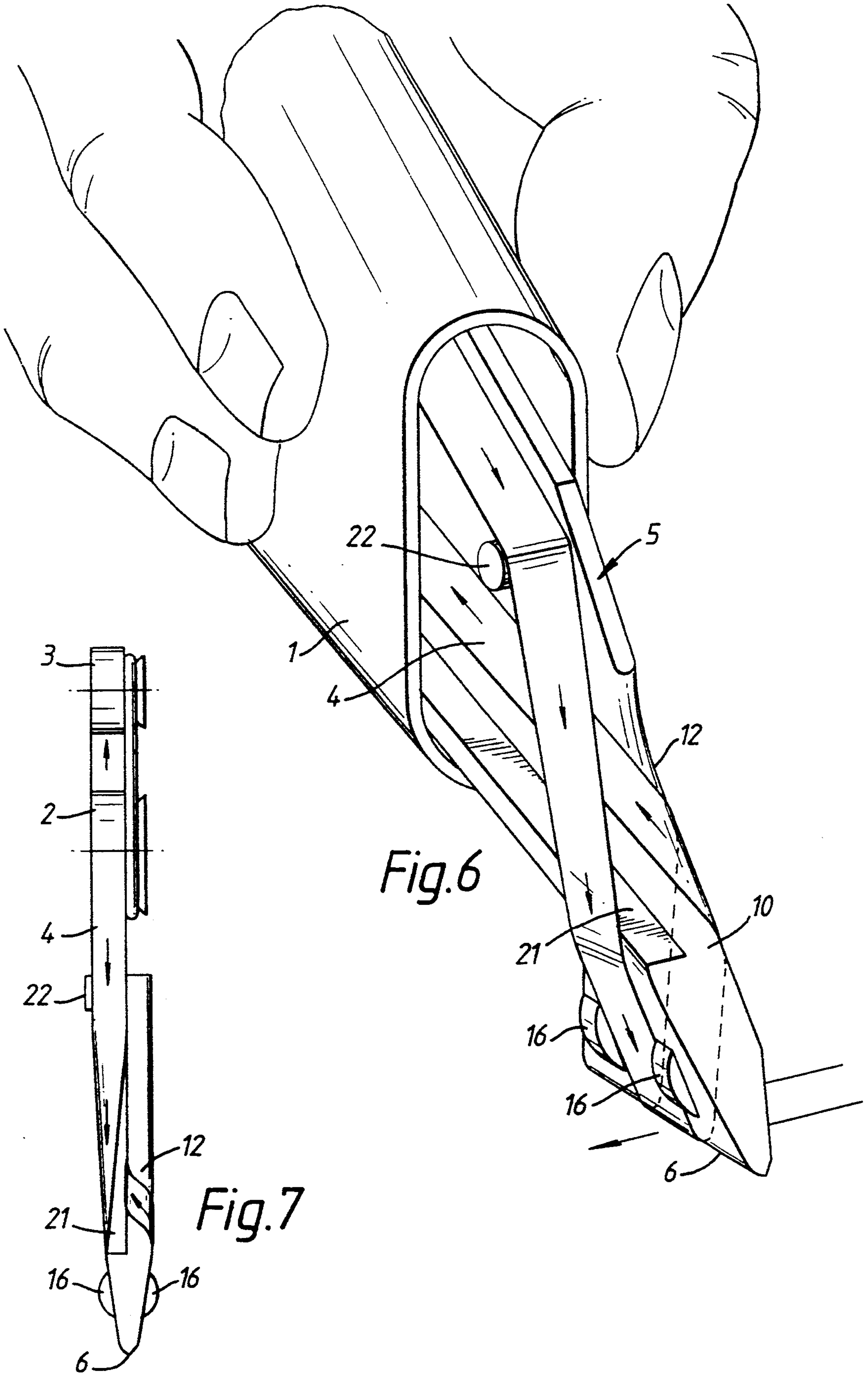
FIG. 6 is a perspective view illustrating the tip region of a modified embodiment of the invention, the housing having been cut away to reveal relevant details of the tape feed path.
FIG. 7 is an elevation showing the internal parts of the dispenser of FIG. 6.

In the dispenser of FIGS. 6 and 7, the tip member is attached to and conveniently integral with a plastics carrier frame which supports the spools 2, 3. The member 5 includes a tip 10 with an edge portion and a guide portion which is inclined to the edge portion and is generally L-shaped in cross-section to define a shoulder 21 at which the guide and edge portions meet. Fixed to or integral with the guide portion are guide means provided by a tape guide peg 22, and by a ridge 12 defining a rectilinear edge inclined to the tape feed direction. On either side of the tip, near the edge 6, tape retaining means are provided by a pair of wing projections 16 spaced apart by a distance equal to the width of the tape. The tape 4 passes forwardly from the supply spool 2 to the peg 22 around which it passes so that the tape then extends towards the edge 6 in a direction essentially at 90° to that edge. The tape section between the peg 22 and the edge of shoulder 21 is twisted through 90° about its longitudinal axis. From the shoulder 21, the tape passes around the tip edge 6 in a plane substantially perpendicular to the tip edge, and eventually reaches the ridge 12 across which it rolls over onto the first side of the tip member to pass on towards the take-up spool. The wing projections 16 serve to maintain the tape in correct alignment with the edge 6.

Figure 8:
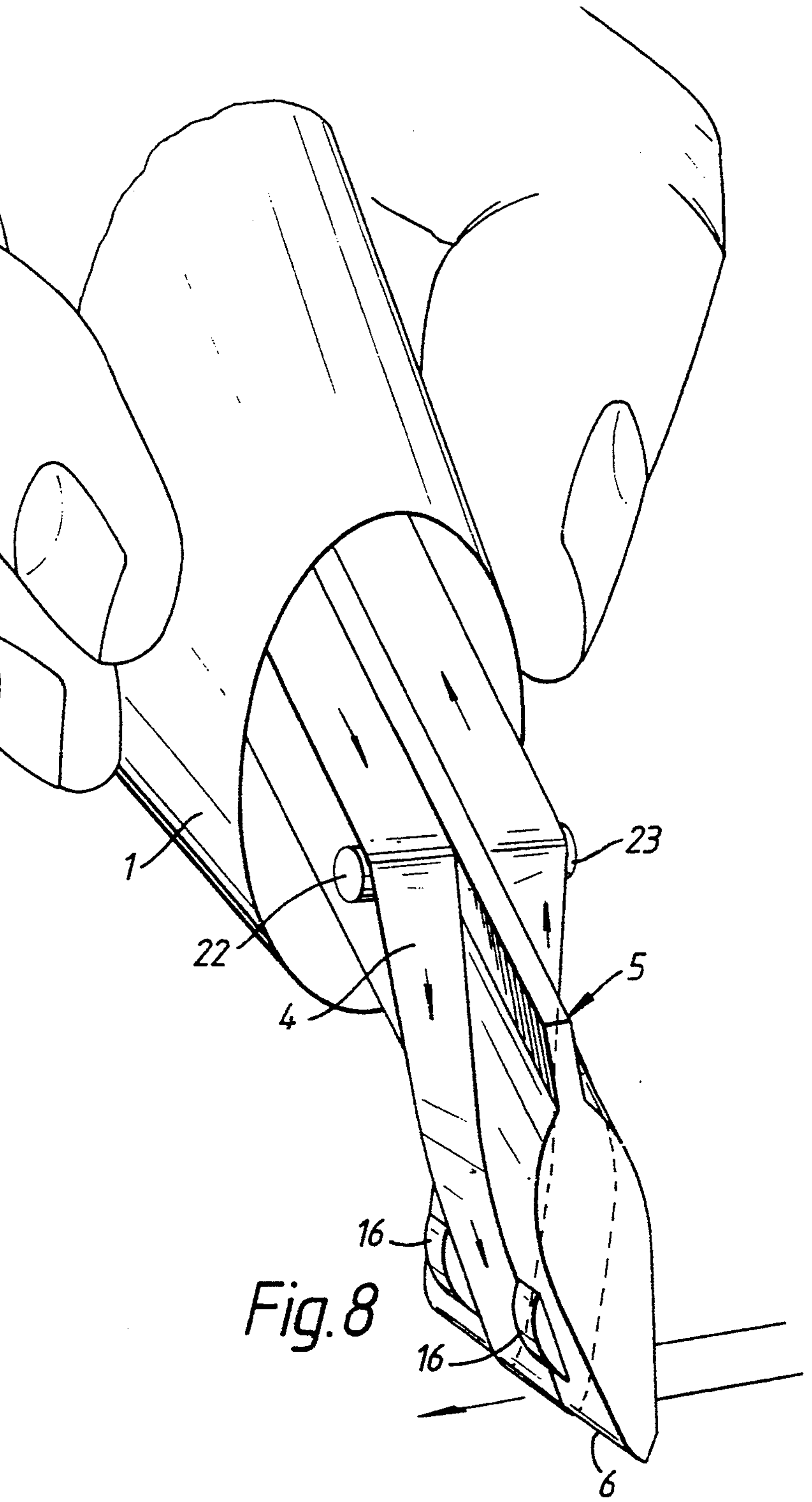
FIGS. 8 and 9 are views corresponding to FIGS. 6 and 7, respectively, showing a second modified correction tape dispenser according to the invention.
Figure 9:
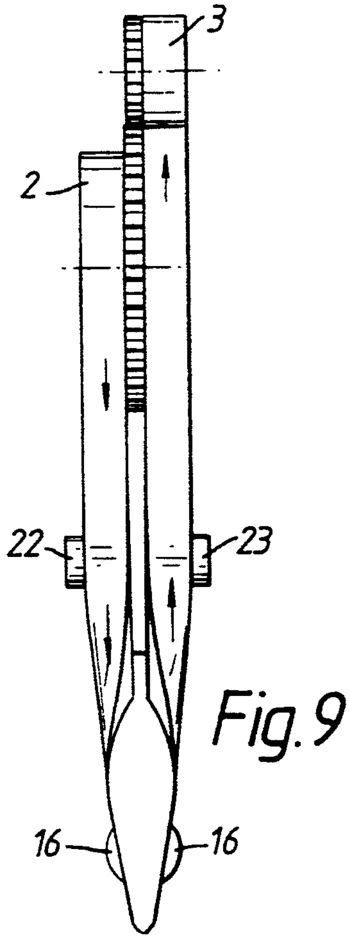

In the construction illustrated in FIGS. 8 and 9, the tip member 5 has tape guide means consisting a pair of opposed guide pegs 22, 23 on opposite sides thereof, and the supply and take-up spools 2,3 are shown mounted to face in opposite directions although this is not essential. The edge portion of the tip is largely similar to that of the dispenser of FIGS. 6 and 7, but has a more rounded or bulbous form opposite the edge 6. The tape guidance is essentially the same on both sides of the tip member with the tape being twisted through 90° in passing from the peg 22 to the edge 6 and being twisted through a further 90° between the edge 6 and the peg 23. With the guide means provided by the pegs 22, 23, the need for tape positioning means is eliminated as the pegs can accommodate the changes in tape path due to the tape diameter on the supply spool reducing, and the tape diameter on the take-up spool increasing, as the tape becomes used up.

In use the modified dispensers are held and moved across the paper exactly as described above in relation to the embodiments of FIGS. 1 to 5. The modified tape guiding means have the advantage of reducing the area of contact between the tape and the tip member so that frictional resistance to tape advancement is diminished and smooth operation of the correction device thereby is enhanced. With a view to reducing friction still further the guide pegs could be equipped with or be replaced by rollers.

Figure 10:
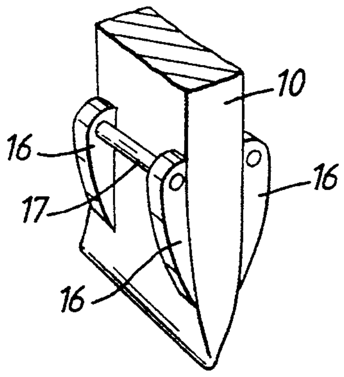
FIG. 10 is a detailed perspective view of the tip edge portion illustrating one form of a tape retention device.
Figure 11:
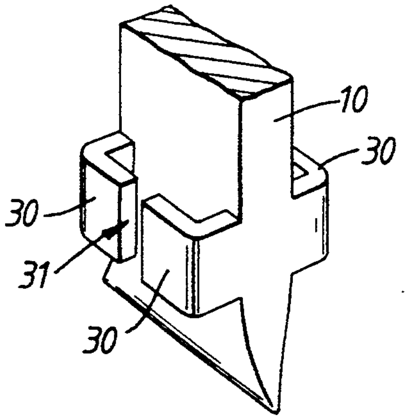
FIGS. 11 to 15 are views similar to FIG. 10 showing alternative devices for retaining the tape in correct cooperation with the tip edge.
Figure 12:
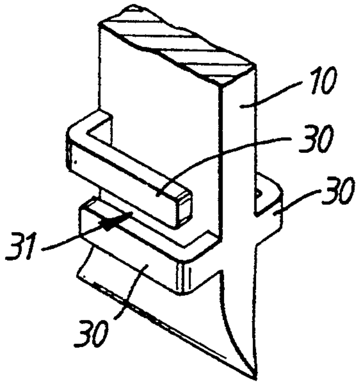
Figure 13:
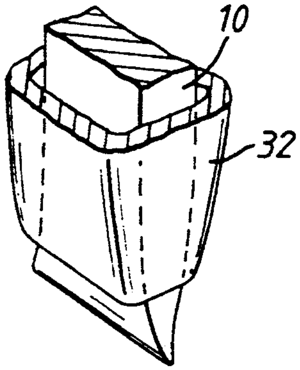
Figure 14:
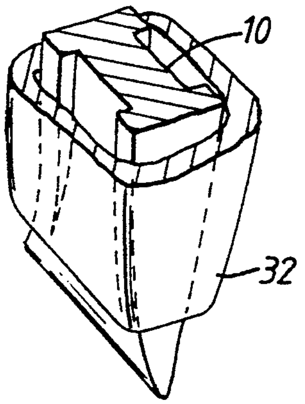
Figure 15:
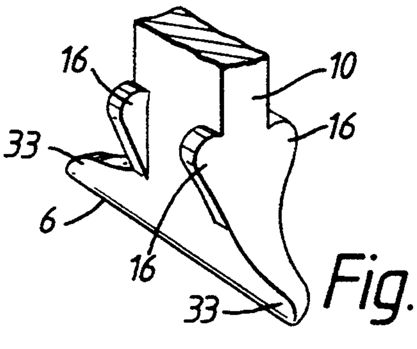

FIG. 10 illustrates in more detail the tape retaining means associated with the tip edge and consisting of the wings 16 and pin 17 which together with the tip form an eye through which the tape passes. FIG. 11 shows a modified construction in which a substantially closed eye is defined by retaining means consisting of opposed L-shaped projections 30 integral with the tip and between which a slot 31 is formed to enable the tape to be introduced laterally into the eye. FIG. 12 shows another modification in which the L-shaped projections 30 overlap, but are displaced along the tip to provide the slot 31 for insertion of the tape. In the construction of FIG. 13, an eye for the tape is defined on each side of the tip by retaining part comprising a sleeve 32 surrounding the tip. The sleeve could be integral with the tip or be formed as an extension on the dispenser body or case. Preferably, however, the sleeve is a separate collar which can be pushed over the tip end after the tape has been correctly positioned around the tip edge. In the further modification of FIG. 14, the tip 10 has an I-shape cross section to locate and positively define the eyes with the collar. Finally, in FIG. 15 the tip is equipped with extensions 33 to elongate the tip edge and reduce the chances of the tape becoming displaced over an edge extremity in use of the dispenser.

I claim as my invention:

1. A correction tape dispenser comprising a tape comprising a carrier ribbon with correction composition thereon, supply and take-up spools for the tape, a tip having an edge for pressing the tape against a surface, a portion of the tape between the supply and take-up spools being guided to extend around said edge, wherein the edge is inclined to a feed direction which is the direction of travel of the tape leaving the supply spool, and the tip includes guide means on either side of the edge which operate in conjunction with the shape of the tip for twisting the tape so that the path of the tape around the edge between the guide means is in a plane substantially perpendicular to said edge and inclined to the feed direction.

2. A correction tape dispenser according to claim 1, wherein the guide means on at least one side of the edge comprises a linear edge around which the tape passes from one side to the other side thereof.

3. A correction tape dispenser according to claim 2, wherein the linear edges are provided on both sides and are defined by parallel ridges.

4. A correction tape dispenser according to claim 3, wherein the tape extends to the inner faces of the respective ridges from the supply and take-up spools, respectively.

5. A correction tape dispenser according to claim 1, wherein tape positioning means are provided to determine a first fixed position from which the tape passes to the tip in the feed direction, and a second fixed position to which the tape passes after leaving the tip.

6. A correction tape dispenser according to claim 5 wherein the tip is provided by a unitary member and said tape positioning means are attached to said tip member.

7. A correction tape dispenser according to claim 1, wherein the guide means on at least one side of the tip comprises a guide element around which the tape passes to define a bend in the tape path.

8. A correction tape dispenser according to claim 7, wherein the guide element defines an arcuate surface contacted by the tape and the arcuate surface has an axis substantially perpendicular to a plane containing the tip edge and parallel to the feed direction.

9. A correction tape dispenser according to claim 1, wherein the guide means on at least one side of the tip comprises a guide element, the guide element twists the tape substantially through 90° between the feed direction and the tip edge.

10. A correction tape dispenser according to claim 9, wherein guide elements are provided on both sides of the tip.

11. A correction tape dispenser according to claim 1, wherein the supply and take-up spools have rotational axes substantially perpendicular to a plane containing the tip edge and parallel to the tape feed direction.

12. A correction tape dispenser according to claim 1, wherein the tip edge direction and the feed direction are at an angle in the range of about 45° to 75° to each other.

13. A correction tape dispenser according to claim 1, wherein retaining means are provided adjacent at least one side of the tip edge for maintaining the tape in correct cooperation with said edge.

14. A correction tape dispenser according to claim 13, wherein the retaining means comprises a pair of projections between which the tape passes.

15. A correction tape dispenser according to claim 14, wherein an element extends between the projections to prevent the tape becoming disengaged therefrom.

16. A correction tape dispenser according to claim 13, wherein the tape retaining means is arranged to define with the tip an eye through which the tape passes.

17. A correction tape dispenser according to claim 16, wherein the retaining means comprises a pair of oppositely directed L-shaped projections, a slot being formed between the projections to allow the tape to be inserted through the eye.

18. A correction tape dispenser according to claim 16, wherein the retaining means comprises a part surrounding the tip to form an eye on either side thereof.

19. A correction tape dispenser according to claim 18, wherein said retaining part is a collar engaged with a push fit over the tip edge.

20. A correction tape dispenser according to claim 1, wherein the tip edge is provided with extension portions to reduce the chances of the tape becoming displaced over an end extremity of the tip edge.

21. A correction tape dispenser according to claim 1, further including a case enclosing the supply and take-up spools, the case being elongated substantially in the feed direction.

* * * * *